United States Patent
Kim et al.

(10) Patent No.: US 8,861,876 B2
(45) Date of Patent: Oct. 14, 2014

(54) PIXEL DATA COMPRESSION DEVICE

(71) Applicant: Samsung Display Co., Ltd., Yongin-si (KR)

(72) Inventors: Byung Hyun Kim, Cheonan-si (KR); Jong Woong Park, Yongin-si (KR); Geun Young Jeong, Busan (KR); Ji Yeon Yang, Cheonan-si (KR); Ju Hyung Lee, Gwacheon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 151 days.

(21) Appl. No.: 13/679,379

(22) Filed: Nov. 16, 2012

(65) Prior Publication Data

US 2013/0343660 A1 Dec. 26, 2013

(30) Foreign Application Priority Data

Jun. 22, 2012 (KR) ........................ 10-2012-0067517

(51) Int. Cl.
*G06K 9/36* (2006.01)
*G06K 9/46* (2006.01)
*G06T 9/00* (2006.01)

(52) U.S. Cl.
CPC ....................................... *G06T 9/00* (2013.01)
USPC ........................................................ 382/232

(58) Field of Classification Search
None
See application file for complete search history.

(56) References Cited

U.S. PATENT DOCUMENTS

| | | | |
|---|---|---|---|
| 5,999,189 A * | 12/1999 | Kajiya et al. | 382/232 |
| 7,991,052 B2 * | 8/2011 | Roman | 375/240.23 |
| 2007/0217704 A1 * | 9/2007 | Zeng et al. | 382/244 |
| 2009/0295816 A1 * | 12/2009 | Kallio | 345/553 |
| 2012/0147831 A1 * | 6/2012 | Golitschek | 370/329 |

FOREIGN PATENT DOCUMENTS

| | | | |
|---|---|---|---|
| KR | 10-2007-0090408 A | 9/2007 |
| KR | 10-2007-0111111 A | 11/2007 |
| KR | 10-2010-0013142 A | 2/2010 |
| KR | 10-2010-0113703 A | 10/2010 |

\* cited by examiner

*Primary Examiner* — Bhavesh Mehta
*Assistant Examiner* — Feng Niu
(74) *Attorney, Agent, or Firm* — Christie, Parker & Hale, LLP (57) ABSTRACT

A pixel data compression device is provided. The device includes: a first judgment unit for comparing a number of bits of a value of first pixel data and a number of bits of a value of second pixel data with a number of reference bits; a format determination unit for determining a format of compressed data, the format corresponding to the number of bits of the value of the first pixel data and the number of bits of the value of the second pixel data; and a compression unit for generating the compressed data, which corresponds to the format of the compressed data, from the first pixel data and the second pixel data. The compressed data includes a flag region, a first data region, and a second data region.

20 Claims, 7 Drawing Sheets

PIXEL DATA COMPRESSION DEVICE

CROSS-REFERENCE TO RELATED PATENT APPLICATION

This application claims priority to and the benefit of Korean Patent Application No. 10-2012-0067517, filed on Jun. 22, 2012 in the Korean Intellectual Property Office, the entire content of which is incorporated herein by reference.

BACKGROUND

1. Field

Aspects of embodiments of the present invention relate to a pixel data compression device.

2. Description of the Related Art

An image may be stored in a display device as information about a plurality of pixels. For example, an image may be split into a plurality of pixels arranged in a matrix, and information about each of the pixels may contain information about the color and brightness of the pixel. Information about one pixel can be split into gray components of red, green, and blue, for example. However, in a monochromatic display, information about one pixel is not split by color, but may contain gray level information.

With the technological advancements, the demand for high-resolution images has increased, leading to an increase in the total size of pixel data that contains information about pixels. Accordingly, apparatuses and methods for compressing pixel data to increase data transmission/reception speed and overcome the limited storage space of a storage device are being developed. However, data loss can occur in the process of compressing pixel data.

For instance, when a display device displays a low brightness (for example, a low gray-level) image, and the gray levels of the low gray-level image are changed, the proportion of the changed gray levels to the previously displayed gray levels is relatively high when compared with a high brightness (for example, a high gray-level) image that experiences the same gray-level change. Therefore, the gray-level change of the low gray-level image can be recognized relatively easily when compared to the same gray-level change of the high gray-level image. Accordingly, when the same compression method is used for low and high gray levels, the loss of pixel data at the low gray levels may be more easily observed, thus deteriorating display quality.

SUMMARY

Aspects of the present invention are directed to a pixel data compression device that can improve the display quality of an image. Aspects of the present invention are also directed to a pixel data compression device that can reduce the loss of pixel data at low gray levels. However, aspects of the present invention are not restricted to these. Rather, these and other aspects of the present invention will become more apparent to one of ordinary skill in the art to which the present invention pertains by referencing the detailed description of exemplary embodiments of the present invention given below.

According to an exemplary embodiment of the present invention, a pixel data compression device is provided. The pixel data compression device includes: a first judgment unit for comparing a number of bits of a value of first pixel data and a number of bits of a value of second pixel data with a number of reference bits; a format determination unit for determining a format of compressed data, the format corresponding to the number of bits of the value of the first pixel data and the number of bits of the value of the second pixel data; and a compression unit for generating the compressed data, which corresponds to the format of the compressed data, from the first pixel data and the second pixel data. The compressed data includes a flag region, a first data region, and a second data region. The format determination unit is configured to determine that the format of the compressed data is a first format when each of the number of bits of the value of the first pixel data and the number of bits of the value of the second pixel data is less than or equal to the number of reference bits. In the first format, a size of the first data region and a size of the second data region are equal to the number of reference bits, a value of the first data region is equal to the value of the first pixel data, and a value of the second data region is equal to the value of the second pixel data.

Each of the first pixel data and the second pixel data may have a size of 8 bits. The number of reference bits may be 5 bits. The compressed data may have a size of 12 bits. The flag region in the first format may have a size of 2 bits.

The number of reference bits may be smaller than a number of bits of the first pixel data and a number of bits of the second pixel data.

The compression device may further include a second judgment unit for determining whether a value obtained by subtracting the second pixel data from the first pixel data corresponds to one of values of difference data that has a size that corresponds to a number of reference difference bits. The values of the difference data may correspond to successive integers. One of the values of the difference data may correspond to zero.

Two of the values of the difference data may correspond to 1 and −1.

The number of reference difference bits may be 2 bits.

What at least one of the number of bits of the value of the first pixel data or the number of bits of the value of the second pixel data exceeds the number of reference bits, and when the value obtained by subtracting the second pixel data from the first pixel data corresponds to one of the values of the difference data, the format determination unit may be configured to determine that the format of the compressed data is a second format. In the second format, the size of the flag region may be equal to the size of the flag region in the first format, the size of the first data region may be equal to a number of bits of the first pixel data, the value of the first data region may be equal to the value of the first pixel data, the size of the second data region may be equal to the number of reference difference bits, and the value of the second data region may correspond to the value obtained by subtracting the second pixel data from the first pixel data.

When each of the number of bits of the value of the first pixel data and the number of bits of the value of the second pixel data exceeds the number of reference bits, and when the value obtained by subtracting the second pixel data from the first pixel data does not correspond to one of the values of the difference data, the format determination unit may be configured to determine that the format of the compressed data is a third format. In the third format, the size of the flag region may be equal to the size of the flag region in the first format, the size of the first data region and the size of the second data region may be equal to the number of reference bits, the value of the first data region may be equal to a value of first high-order bits of the first pixel data, a number of the first high-order bits may be equal to the size of the first data region, the value of the second data region may be equal to a value of second high-order bits of the second pixel data, and a number of the second high-order bits may be equal to the size of the second data region.

When each of the number of bits of the value of the first pixel data and the number of bits of the value of the second pixel data is less than the number of reference bits, and when the value obtained by subtracting the second pixel data from the first pixel data corresponds to one of the values of the difference data, the format determination unit may be configured to determine that the format of the compressed data is the first format.

When the number of bits of the value of the first pixel data exceeds the number of reference bits, when the number of bits of the value of the second pixel data is less than or equal to the number of reference bits, and when the value obtained by subtracting the second pixel data from the first pixel data does not correspond to one of the values of the difference data, the format determination unit may be configured to determine that the format of the compressed data is a fourth format. In the fourth format, the size of the flag region may be 1 bit greater than the size of the flag region in the first format, the size of the first data region may be equal to the number of reference bits, the value of the first data region may be equal to the value of high-order bits of the first pixel data, a number of the high-order bits may be equal to the size of the first data region, the size of the second data region may be 1 bit smaller than the number of reference bits, and the value of the second data region may be equal to a value obtained by removing a least significant bit (LSB) from a number of low-order bits of the second pixel data equal to the number of reference bits.

When the number of bits of the value of the first pixel data is less than or equal to the number of reference bits, when the number of bits of the value of the second pixel data is greater than the number of reference bits, and when the value obtained by subtracting the second pixel data from the first pixel data does not correspond to one of the values of the difference data, the format determination unit may be configured to determine that the format of the compressed data is a fifth format. In the fifth format, the size of the flag region may be 1 bit greater than the size of the flag region in the first format, the size of the first data region may be 1 bit smaller than the number of reference bits, the value of the first data region may be equal to a value obtained by removing a least significant bit (LSB) from a number of low-order bits of the first pixel data equal to the number of reference bits, the size of the second data region may be equal to the number of reference bits, the value of the second data region may be equal to the value of high-order bits of the second pixel data, and a number of the high-order bits may be equal to the size of the second data region.

According to another exemplary embodiment of the present invention, a pixel data compression device is provided. The pixel data compression device includes: a first judgment unit for comparing a number of bits of a value of first pixel data and a number of bits of a value of second pixel data with a number of reference bits; a format determination unit for determining a format of compressed data that corresponds to the number of bits of the value of the first pixel data and the number of bits of the value of the second pixel data; and a compression unit for generating the compressed data, which corresponds to the format of the compressed data, from the first pixel data and the second pixel data. The compressed data includes a flag region, a first data region, and a second data region. The format determination unit is configured to determine that the format of the compressed data is a first format when each of the number of bits of the value of the first pixel data and the number of bits of the value of the second pixel data is less than or equal to the number of reference bits. In the first format, a size of the flag region is a number of reference flag bits, a size of the first data region and a size of the second data region are 1 bit smaller than the number of reference bits, a value of the first data region is equal to a value obtained by removing a least significant bit (LSB) from a number of low-order bits of the first pixel data equal to the number of reference bits, and a value of the second data region is equal to a value obtained by removing the LSB from a number of low-order bits of the second pixel data equal to the number of reference bits.

Each of the first pixel data and the second pixel data may have a size of 8 bits, the number of reference bits may be 4 bits, the compressed data may have a size of 12 bits, and the number of reference flag bits may be 4 bits.

The compression device may further include a second judgment unit for determining whether a value obtained by subtracting the second pixel data from the first pixel data corresponds to one of values of difference data that has a size corresponding to a number of reference difference bits. The values of the difference data may correspond to successive integers. One of the values of the difference data may correspond to zero.

The number of reference difference bits may be 3 bits.

When the value obtained by subtracting the second pixel data from the first pixel data corresponds to one of the values of the difference data, the format determination unit may be configured to determine that the format of the compressed data is a second format. The size of the flag region may be 3 bits smaller than the number of reference flag bits, the size of the first data region may be equal to a number of bits of the first pixel data, the value of the first data region may be equal to the value of the first pixel data, the size of the second data region may be equal to the number of reference difference bits, and the value of the second data region may correspond to the value obtained by subtracting the second pixel data from the first pixel data.

When each of the number of bits of the value of the first pixel data and the number of bits of the value of the second pixel data exceeds the number of reference bits, and when the value obtained by subtracting the second pixel data from the first pixel data does not correspond to one of the values of the difference data, the format determination unit may be configured to determine that the format of the compressed data is a third format. In the third format, the size of the flag region may be 2 bits smaller than the number of reference flag bits, the size of the first data region and the size of the second data region may be equal to the number of reference bits, the value of the first data region may be equal to a value of first high-order bits of the first pixel data, a number of the first high-order bits may be equal to the number of reference bits, the value of the second data region may be equal to a value of second high-order bits of the second pixel data, and a number of the second high-order bits may be equal to the number of reference bits.

When each of the number of bits of the value of the first pixel data and the number of bits of the value of the second pixel data is less than or equal to the number of reference bits, and when the value obtained by subtracting the second pixel data from the first pixel data corresponds to one of the values of the difference data, the format determination unit may be configured to determine that the format of the compressed data is not the first format.

When the number of bits of the value of the first pixel data exceeds the number of reference bits, when the number of bits of the value of the second pixel data is less than or equal to the number of reference bits, and when the value obtained by subtracting the second pixel data from the first pixel data does not correspond to one of the values of the difference data, the format determination unit may be configured to determine that the format of the compressed data is a fourth format. In the fourth format, the size of the flag region may be 1 bit smaller than the number of reference flag bits, the size of the first data region may be equal to the number of reference bits, the value of the first data region may be equal to a value of high-order bits of the first pixel data, a number of the high-order bits may be equal to the size of the first data region, the size of the second data region may be 1 bit smaller than the number of reference bits, and the value of the second data region may be equal to the value obtained by removing the LSB from the number of low-order bits of the second pixel data equal to the number of reference bits.

When the number of bits of the value of the first pixel data is less than or equal to the number of reference bits, when the number of bits of the value of the second pixel data exceeds the number of reference bits, and when the value obtained by subtracting the second pixel data from the first pixel data does not correspond to one of the values of the difference data, the format determination unit may be configured to determine that the format of the compressed data is a fifth format. In fifth format, the size of the flag region may be equal to the number of reference flag bits, the size of the first data region may be 2 bits smaller than the number of reference bits, the value of the first data region may be equal to a value obtained by removing 2 LSBs from the number of low-order bits of the first pixel data equal to the number of reference bits, the size of the second data region may be equal to the number of reference bits, the value of the second data region may be equal to a value of high-order bits of the second pixel data, and a number of the high-order bits may be equal to the size of the second data region.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Exemplary embodiments of the present invention will now be described more fully hereinafter with reference to the accompanying drawings. However, the present invention may be embodied in different forms and should not be construed as limited to the exemplary embodiments set forth herein. Rather, these embodiments are provided to more fully convey the scope of the present invention to those skilled in the art. The same reference numbers indicate the same components throughout the specification. In the attached figures, the thickness of layers and regions may be exaggerated for clarity.

Throughout the description, the number of bits of a value of data refers to the number of digits in a binary representation of the value of the data without leading zeros (i.e., the smallest number of digits in the standard binary representation of the data), whereas the size of the data (or number of bits of the data) refers to the number of bits used to store the data. For example, when the value of the data is expressed as a binary number '10011,' the number of bits of the value of the data is 5 bits. In other words, the number of bits of the value of the data is counted starting with the most significant digit having a value of '1' in a binary representation of the data. For example, when data has a size of 8 bits and is '00110101,' since the most significant digit having a value of '1' is the sixth digit (counting from the least significant digit to the most significant digit), the number of bits of the value of the data is 6 bits.

Figure 1:
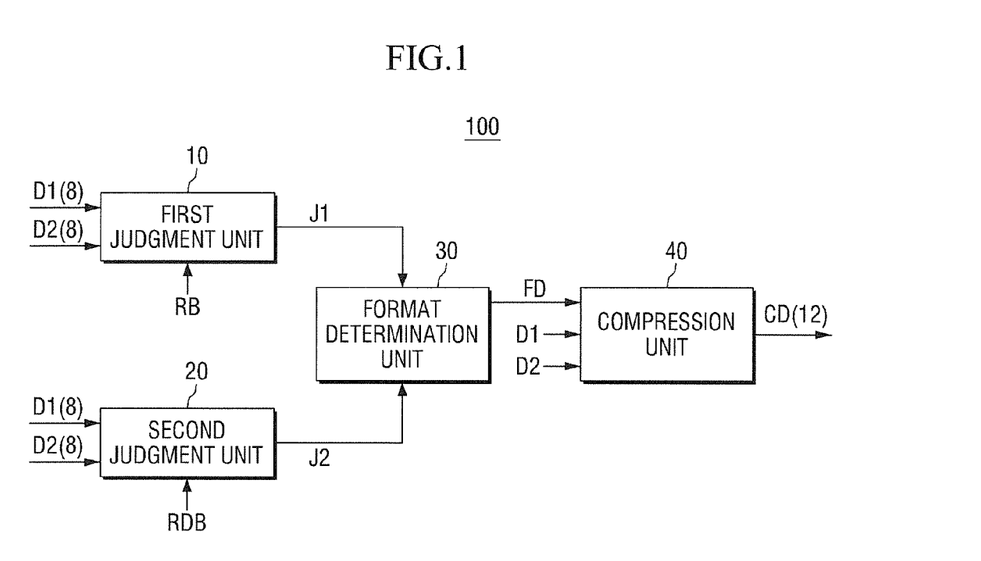
FIG. 1 is a block diagram of a pixel data compression device according to an embodiment of the present invention.

FIG. 1 is a block diagram of a pixel data compression device 100 according to an embodiment of the present invention.

Referring to FIG. 1, the pixel data compression device 100 includes a first judgment unit 10, a format determination unit 30, and a compression unit 40. The pixel data compression device 100 may be implemented, for example, as a computing device, such as a microprocessor, and may output its data to an electronic storage device, such as random access memory.

The first judgment unit 10 receives first pixel data D1 and second pixel data D2, and compares the number of bits of a value of the first pixel data D1 and the number of the bits of a value of the second pixel data D2 to a number of reference bits RB.

The first pixel data D1 and the second pixel data D2 may indicate gray levels of a first pixel and a second pixel of an image, respectively. For example, the first pixel and the second pixel may be pixels adjacent to each other in a single frame of a still image or a moving image. In another example, the first pixel and the second pixel may be pixels located at the same position in successive frames of a moving image.

Each of the first pixel data D1 and the second pixel data D2 will be described as having a size of 8 bits, though this can vary in other embodiments. According to some embodiments, the first pixel data D1 and the second pixel data D2 may have different sizes.

The number of reference bits RB may, for example, be a set value that is smaller than the number of bits of each of the first pixel data D1 and the second pixel data D2 (i.e., smaller than the size of each of the first pixel data D1 and the second pixel data D2). The number of reference bits RB, for example, may be 5 bits. However, the number of reference bits RB can vary in other embodiments.

The first judgment unit 10 compares the number of bits of the value of the first pixel data D1 and the number of bits of the value of the second pixel data D2 to the number of reference bits RB and outputs the comparison result as first judgment data J1.

The format determination unit 30 determines the format of compressed data CD based on the first judgment data J1. The format determination unit 30 outputs information about the determined format of the compressed data CD as format data FD. A method of determining the format of the compressed data CD using the format determination unit 30 will be described in more detail later with reference to FIG. 2.

The compression unit 40 generates the compressed data CD corresponding to the format data FD from the first pixel data D1 and the second pixel data D2. The size of the compressed data CD is smaller than the sum of the size of the first pixel data D1 and the size of the second pixel data D2. For example, the size of the compressed data CD may be 12 bits when the size of each of the first pixel data D1 and the second pixel data D2 is 8 bits. However, the size of the compressed data CD can vary in other embodiments.

The pixel data compression device 100 may further include a second judgment unit 20. The second judgment unit 20 determines whether a difference value obtained by subtracting the value of the second pixel data D2 from the value of the first pixel data D1 corresponds to one of values of difference data DV, which may be a field having a size of a number of reference difference bits RDB, and outputs the determination result as second judgment data J2.

The number of reference difference bits RDB may correspond to the size of (for example, the number of elements of) the difference data DV. The elements of the difference data DV may correspond to the value obtained by subtracting the value of the second pixel data D2 from the value of the first pixel data D1. For example, the number of reference difference bits RDB may be 2 bits. When the number of reference difference bits RDB is 2 bits, the difference data DV may have values of '00,' '01,' '10,' or '11.' Values that the difference data DV can have may correspond to successive integers. For example, '00' may correspond to −2, '01' may correspond to −1, '10' may correspond to 0, and '11' may correspond to 1. Each of the integers corresponding to the values that the difference data DV can have may correspond to the value obtained by subtracting the value of the second pixel data D2 from the value of the first pixel data D1.

The successive integers corresponding respectively to the values that the difference data DV can have may vary depending on the embodiment. According to some embodiments, one of the values that the difference data DV can have corresponds to 0. According to some other embodiments, three of the values that the difference data DV can have correspond to −1, 0, and 1. When one of the values that the difference data DV can have corresponds to 0 or when three of the values that the difference data DV can have correspond to −1, 0, and 1, data loss that may occur in the process of generating the compressed data CD when a difference between the value of the first pixel data D1 and the second pixel data D2 is small can be reduced or prevented. This will be described in more detail later. In addition, although the number of reference difference bits RDB is 2 as described above, the number of reference difference bits RDB can vary in other embodiments.

The second judgment data J2 is provided to the format determination unit 30. Accordingly, the format determination unit 30 may determine the format of the compressed data CD by referring to the second judgment data J2.

Figure 2:
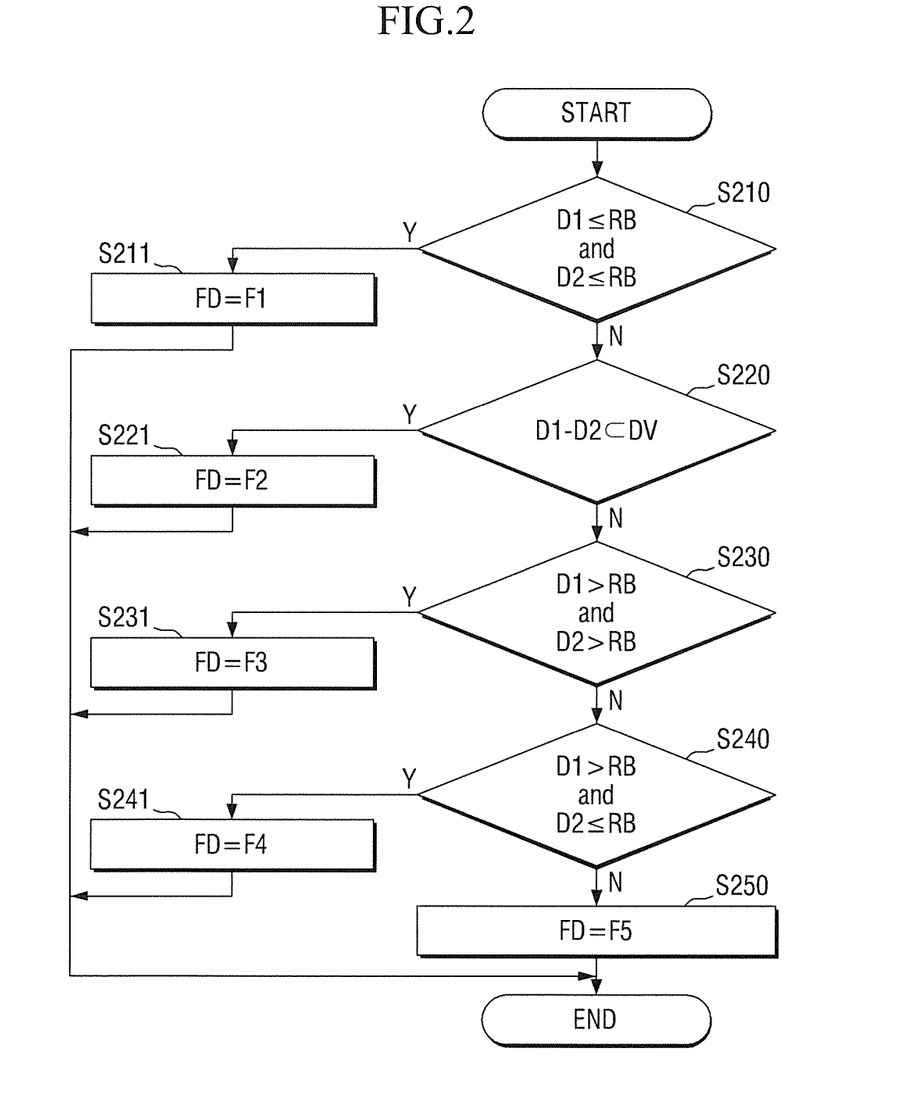
FIG. 2 is a flowchart illustrating a method of determining the format of compressed data using a format determination unit according to an embodiment of the present invention.

Hereinafter, a method of determining the format of compressed data CD using the format determination unit 30 will be described with reference to FIG. 2. FIG. 2 is a flowchart illustrating a method of determining the format of compressed data CD using the format determination unit 30 according to an embodiment of the present invention.

Referring to FIG. 2, the format determination unit 30 determines in step S210 whether each of the number of bits of a value of first pixel data D1 and the number of bits of a value of second pixel data D2 is less than or equal to a number of reference bits RB. When each of the number of bits of the value of the first pixel data D1 and the number of bits of the value of the second pixel data D2 is less than or equal to the number of reference bits RB, the format determination unit 30 determines in step S211 that the format of compressed data CD is a first format F1 and generates format data FD corresponding to the first format F1.

Figure 3:
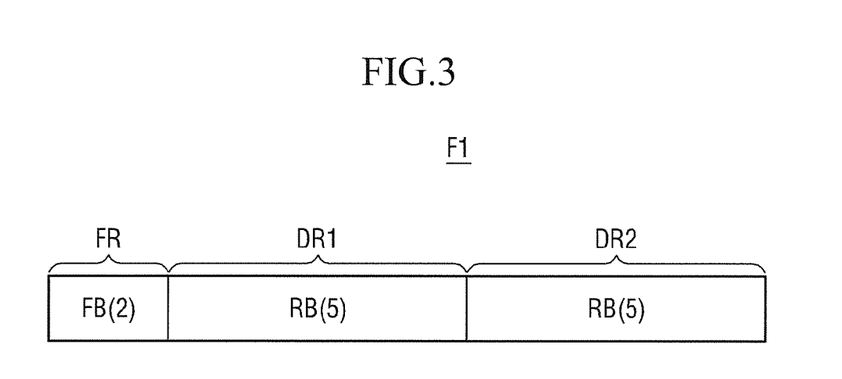
FIG. 3 is a diagram illustrating compressed data in a first format according to an embodiment of the present invention.

The first format F1 will now be described with reference to FIG. 3. FIG. 3 is a diagram illustrating the compressed data CD in the first format F1 according to an embodiment of the present invention.

Referring to FIG. 3, the compressed data CD includes a flag region FR, a first data region DR1, and a second data region DR2. The flag region FR, the first data region DR1, and the second data region DR2 are arranged sequentially in the compressed data CD. However, the order in which the flag region FR, the first data region DR1, and the second data region DR2 are arranged can be changed in other embodiments.

The flag region FR is a region indicating the format of the compressed data CD. A value of the flag region FR varies according to the format of the compressed data CD. In the first format F1, the flag region FR has a size of a number of reference flag bits FB. For example, the number of reference flag bits FB may be 2 bits. More specifically, the value of the flag region FR may be '$10_{(2)}$.'

In the first format F1, the first data region DR1 has a size of the number of reference bits RB. For example, when the number of reference bits RB is 5 bits, the size of the first data region DR1 is 5 bits. In the first format F1, a value of the first data region DR1 is set to the value of the first pixel data D1. When the format of the compressed data CD is the first format F1, the number of bits of the value of the first pixel data D1 is less than or equal to the number of reference bits RB. Thus, the first pixel data D1 can be stored without loss in the first data region DR1 having the size of the number of reference bits RB. Therefore, at low gray levels at which the number of bits of the value of the first pixel data D1 is less than or equal to the number of reference bits RB, the pixel data compression device 100 can compress pixel data without loss, thereby improving display quality at the low gray levels.

In the first format F1, the second data region DR2 also has a size of the number of reference bits RB. For example, when the number of reference bits RB is 5 bits, the size of the second data region DR2 is 5 bits. In the first format F1, a value of the second data region DR2 is set to the value of the second pixel data D2. When the format of the compressed data CD is the first format F1, the number of bits of the value of the second pixel data D2 is less than or equal to the number of reference bits RB. Thus, the second pixel data D2 can be stored without loss in the second data region DR2 having the size of the number of reference bits RB. Therefore, at low gray levels at which the number of bits of the value of the second pixel data D2 is less than or equal to the number of reference bits RB, the pixel data compression device 100 can compress pixel data without loss, thereby improving display quality at the low gray levels.

In the first format F1, since the pixel data compression device 100 can compress, without loss, the first pixel data D1 and the second pixel data D2 having low gray values, it can improve display quality at low gray levels.

Referring back to FIG. 2, the format determination unit 30 determines in step S210 whether each of the number of bits of the value of the first pixel data D1 and the number of bits of the value of the second pixel data D2 is less than or equal to the number of reference bits RB. When determining that one of the number of bits of the value of the first pixel data D1 or the number of bits of the value of the second pixel data D2 is not less than or equal to the number of reference bits RB (that is, one of the number of bits of the value of the first pixel data D1 or the number of bits of the value of the second pixel data D2 is greater than the number of reference bits RB), the format determination unit 30 determines in step S220 whether a value obtained by subtracting the value of the second pixel data D2 from the value of the first pixel data D1 is one of values corresponding to difference data DV.

When determining that the value obtained by subtracting the value of the second pixel data D2 from the value of the first pixel data D1 is one of the values corresponding to the difference data DV, the format determination unit 30 determines in step S221 that the format of the compressed data CD is a second format F2 and generates the format data FD corresponding to the second format F2.

Figure 4:
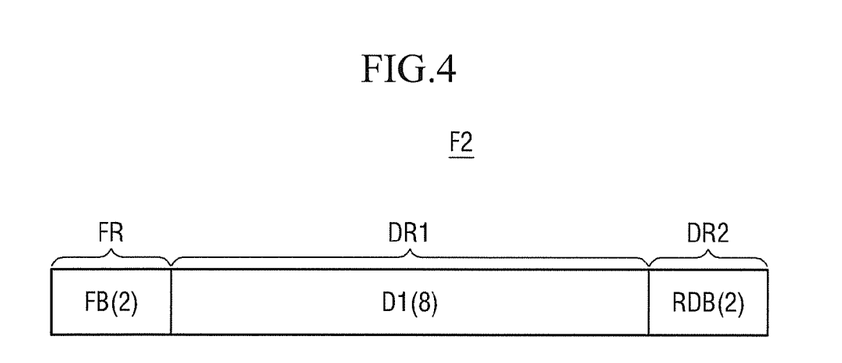
FIG. 4 is a diagram illustrating compressed data in a second format according to an embodiment of the present invention.

The second format F2 will now be described with reference to FIG. 4. FIG. 4 is a diagram illustrating the compressed data CD in the second format F2 according to an embodiment of the present invention.

Referring to FIG. 4, in the second format F2, the size of the flag region FR is equal to the number of reference flag bits FB. For example, the size of the flag region FR may be 2 bits. The value of the flag region FR in the second format F2 is different from the value of the flag region FR in the first format F1. For example, when the value of the flag region FR in the first format F1 is '$10_{(2)}$,' the value of the flag region FR in the second format F2 may be '$00_{(2)}$.'

In the second format F2, the size of the first data region DR1 is equal to the size of the first pixel data D1. For example, when the size of the first pixel data D1 is 8 bits, the size of the first data region DR1 is 8 bits. The value of the first data region DR1 is equal to the value of the first pixel data D1.

In the second format F2, the size of the second data region DR2 is equal to a number of reference difference bits RDB. For example, when the number of reference difference bits RDB is 2 bits, the size of the second data region DR2 is 2 bits. The value of the second data region DR2 is a value of the difference data DV that corresponds to the value obtained by subtracting the value of the second pixel data D2 from the value of the first pixel data D1.

In the second format F2, the value of the first pixel data D1 is stored without loss in the first data region DR1, and a value corresponding to the value obtained by subtracting the value of the second pixel data D2 from the value of the first pixel data D1 is stored without loss in the second data region DR2. Therefore, the first pixel data D1 and the second pixel data D2 can be compressed without loss. For example, when one of values that the difference data DV can have corresponds to 0 or when three of the values that the difference data DV can have correspond to −1, 0, and 1, if the difference between the value of the first pixel data D1 and the value of the second pixel data D2 is small, the first pixel data D1 and the second pixel data D2 can be compressed without loss. That is, in the second format F2, display quality in areas with a relatively small gray-level change can be improved.

Referring back to FIG. 2, when determining in step S220 that the value obtained by subtracting the value of the second pixel data D2 from the value of the first pixel data D1 is not one of the values corresponding to the difference data DV, the format determination unit 30 determines in step S230 whether both the number of bits of the value of the first pixel data D1 and the number of bits of the value of the second pixel data D2 exceed the number of reference bits RB.

When determining that both the number of bits of the value of the first pixel data D1 and the number of bits of the value of the second pixel data D2 exceed the number of reference bits RB, the format determination unit 30 determines in step S231 that the format of the compressed data CD is a third format F3 and generates the format data FD corresponding to the third format F3.

Figure 5:
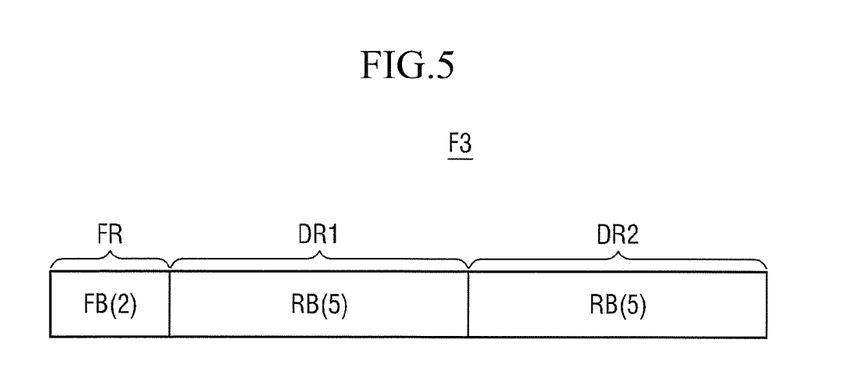
FIG. 5 is a diagram illustrating compressed data in a third format according to an embodiment of the present invention.

The third format F3 will now be described with reference to FIG. 5. FIG. 5 is a diagram illustrating the compressed data CD in the third format F3 according to an embodiment of the present invention.

Referring to FIG. 5, in the third format F3, the size of the flag region FR is equal to the number of reference flag bits FB. For example, the size of the flag region FR may be 2 bits. The value of the flag region FR in the third format F3 is different from the value of the flag region FR in the first format F1 and the value of the flag region FR in the second format F2. For example, when the value of the flag region FR in the first format F1 is '$10_{(2)}$' and when the value of the flag region FR in the second format F2 is '$00_{(2)}$,' the value of the flag region FR in the third format F3 may be '$01_{(2)}$.'

In other embodiments, the values of the flag region FR in the first through third formats F1 through F3 can be swapped with each other. In addition, the values of the flag region FR in the first through third formats F1 through F3 may not include a particular value, which can be assumed without loss of generality to be '$11_{(2)}$.' When the 2 high-order bits of the flag region FR are '$11_{(2)}$,' the 2 high-order bits and the next high-order bit may be recognized as the flag region FR. That is, when the 2 high-order bits of the flag region FR are '$11_{(2)}$,' the size of the flag region FR may exceed 2 bits. In other words, the flag region FR may have a variable length.

As illustrated in FIG. 5, in the third format F3, the size of the first data region DR1 is the number of reference bits RB. For example, when the number of reference bits RB is 5 bits, the size of the first data region DR1 is 5 bits. The value of the first data region DR1 is equal to a value of the high-order bits of the first pixel data D1, the number of high-order bits being equal to the size of the first data region DR1. For example, when the first pixel data D1 is '$11010011_{(2)}$,' the value of the 5-bit first data region DR1 is '$11010_{(2)}$.'

In the third format F3, the size of the second data region DR2 is the number of reference bits RB. For example, when the number of reference bits RB is 5 bits, the size of the second data region DR2 is 5 bits. The value of the second data region DR2 is equal to a value of the high-order bits of the second pixel data D2, the number of high-order bits being equal to the size of the second data region DR2.

Referring back to FIG. 2, when determining in step S230 that one of the number of bits of the value of the first pixel data D1 or the number of bits of the value of the second pixel data D2 does not exceed the number of reference bits RB, the format determination unit 30 determines in step S240 whether the number of bits of the value of the first pixel data D1 exceeds the number of reference bits RB and whether the number of bits of the value of the second pixel data D2 is less than or equal to the number of reference bits RB.

When determining that the number of bits of the value of the first pixel data D1 exceeds the number of reference bits RB and that the number of bits of the value of the second pixel data D2 is less than or equal to the number of reference bits RB, the format determination unit 30 determines in step S241 that the format of the compressed data CD is a fourth format F4 and generates the format data FD corresponding to the fourth format F4.

Figure 6:
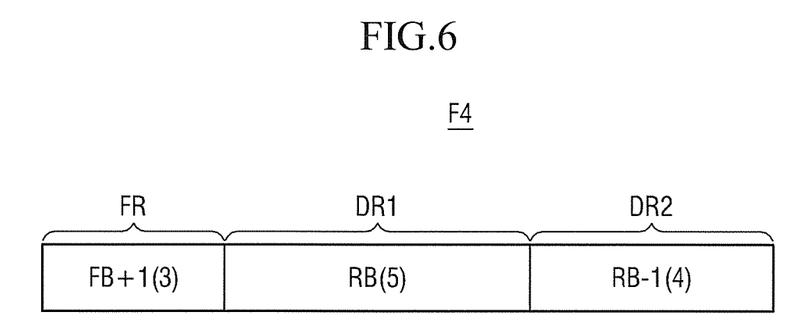
FIG. 6 is a diagram illustrating compressed data in a fourth format according to an embodiment of the present invention.

The fourth format F4 will now be described with reference to FIG. 6. FIG. 6 is a diagram illustrating the compressed data CD in the fourth format F4 according to an embodiment of the present invention.

Referring to FIG. 6, in the fourth format F4, the size of the flag region FR is 1 bit greater than the number of reference flag bits FB. For example, when the number of reference flag bits FB is 2 bits, the size of the flag region FR is 3 bits. For example, the value of the flag region FR may be a value whose 2 high-order bits are '$11_{(2)}$.' That is, the value of the flag region FR may be '$110_{(2)}$,' or '$111_{(2)}$.'

In the fourth format F4, the size of the first data region DR1 is the number of reference bits RB. For example, when the number of reference bits RB is 5 bits, the size of the first data region DR1 is 5 bits. The value of the first data region DR1 is equal to the value of the high-order bits of the first pixel data D1, the number of high-order bits being equal to the size of the first data region DR1.

In the fourth format F4, the size of the second data region DR2 is 1 bit smaller than the number of reference bits RB. For example, when the number of reference bits RB is 5 bits, the size of the second data region DR2 is 4 bits. The value of the second data region DR2 is equal to a value obtained by removing a least significant bit (LSB) from the number of low-order bits of the second pixel data D2 equal to the number of reference bits RB. For example, when the second pixel data D2 is '$00001101_{(2)}$,' and when the number of reference bits RB is 5 bits, the value of the second data region DR2 is '$0110_{(2)}$.'

In the fourth format F4, if each of the first pixel data D1 and the second pixel data D2 has a size of 8 bits, and if the number of reference bits RB is 5 bits, then when the first pixel data D1 is stored in the first data region DR1, 3 low-order bits of data are lost. On the other hand, when the second pixel data D2, which is relatively low gray-level data, is stored in the second data region DR2, only 1 low-order bit of data is lost. Therefore, the pixel data compression device 100 can reduce the loss of low gray-level pixel data in the fourth format F4, thereby reducing or preventing the deterioration of display quality at low gray levels.

Referring back to FIG. 2, when determining in step S240 that the number of bits of the value of the first pixel data D1 does not exceed the number of reference bits RB and that the number of bits of the value of the second pixel data D2 is not less than or equal to the number of reference bits RB, the format determination unit 30 determines in step S250 that the format of the compressed data CD is a fifth format F5 and generates the format data FD corresponding to the fifth format F5.

When the format of the compressed data CD is determined to be the fifth format F5, it means that negative decisions were made in steps S210 through S240. Therefore, the number of bits of the value of the first pixel data D1 is less than or equal to the number of reference bits RB, and the number of bits of the value of the second pixel data D2 exceeds the number of reference bits RB. In other words, if negative decisions were made in steps S210 through S240, the format of the compressed data CD is determined in step S250 to be the fifth format F5 without the need to determine whether the number of bits of the value of the first pixel data D1 is less than or equal to the number of reference bits RB and whether the number of bits of the value of the second pixel data D2 exceeds the number of reference bits RB, and the format data FD corresponding to the fifth format F5 can be generated.

In other embodiments, the method of determining the format of the compressed data CD using the format determination unit 30 may include determining whether the number of bits of the value of the second pixel data D2 exceeds the number of reference bits RB. In this case, when the number of bits of the value of the second pixel data D2 exceeds the number of reference bits RB, the format of the compressed data CD may be determined to be the fifth format F5. In still other embodiments, the method of determining the format of the compressed data CD using the format determination unit 30 may include determining whether the number of bits of the value of the first pixel data D1 does not exceed the number of reference bits RB. In addition, steps S230 and S240 can be reversed, and the last step (i.e., S230 or S240) can be omitted. Here, a format corresponding to the omitted step may be determined to be the format of the compressed data CD.

Figure 7:
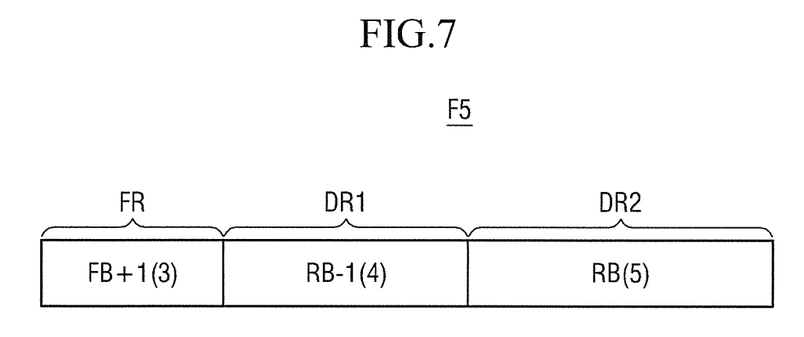
FIG. 7 is a diagram illustrating compressed data in a fifth format according to an embodiment of the present invention.

The fifth format F5 will now be described with reference to FIG. 7. FIG. 7 is a diagram illustrating the compressed data CD in the fifth format F5 according to an embodiment of the present invention.

Referring to FIG. 7, in the fifth format F5, the size of the flag region FR is 1 bit greater than the number of reference flag bits FB. For example, when the number of reference flag bits FB is 2 bits, the size of the flag region FR is 3 bits. For example, the value of the flag region FR may be a value whose 2 high-order bits are '$11_{(2)}$.' That is, the value of the flag region FR may be '$110_{(2)}$,' or '$111_{(2)}$.' The value of the flag region FR in the fifth format F5 id different from the value of the flag region FR in the fourth format F4. For example, when the value of the flag region FR in the fourth format F4 is '$110_{(2)}$,' the value of the flag region FR in the fifth format F5 is '$111_{(2)}$,' and vice versa.

In the fifth format F5, the size of the first data region DR1 is 1 bit smaller than the number of reference bits RB. For example, when the number of reference bits RB is 5 bits, the size of the first data region DR1 is 4 bits. The value of the first data region DR1 is equal to a value obtained by removing the LSB from the number of low-order bits of the first pixel data D1 equal to the number of reference bits RB.

In the fifth format F5, the size of the second data region DR2 is the number of reference bits RB. For example, when the number of reference bits RB is 5 bits, the size of the second data region DR2 is 5 bits. The value of the second data region DR2 is equal to the value of the high-order bits of the second pixel data D2, the number of high-order bits being equal to the size of the second data region DR2.

In the fifth format F5, if each of the first pixel data D1 and the second pixel data D2 has a size of 8 bits, and if the number of reference bits RB is 5 bits, then when the second pixel data D2 is stored in the second data region DR2, 3 low-order bits of data are lost. On the other hand, in the fifth format F5, when the first pixel data D1, which is relatively low gray-level data, is stored in the first data region DR1, only 1 low-order bit of data is lost. Therefore, the pixel data compression device 100 can reduce the loss of low gray-level pixel data in the fifth format F5, thereby preventing the deterioration of display quality at low gray levels.

Figure 8:
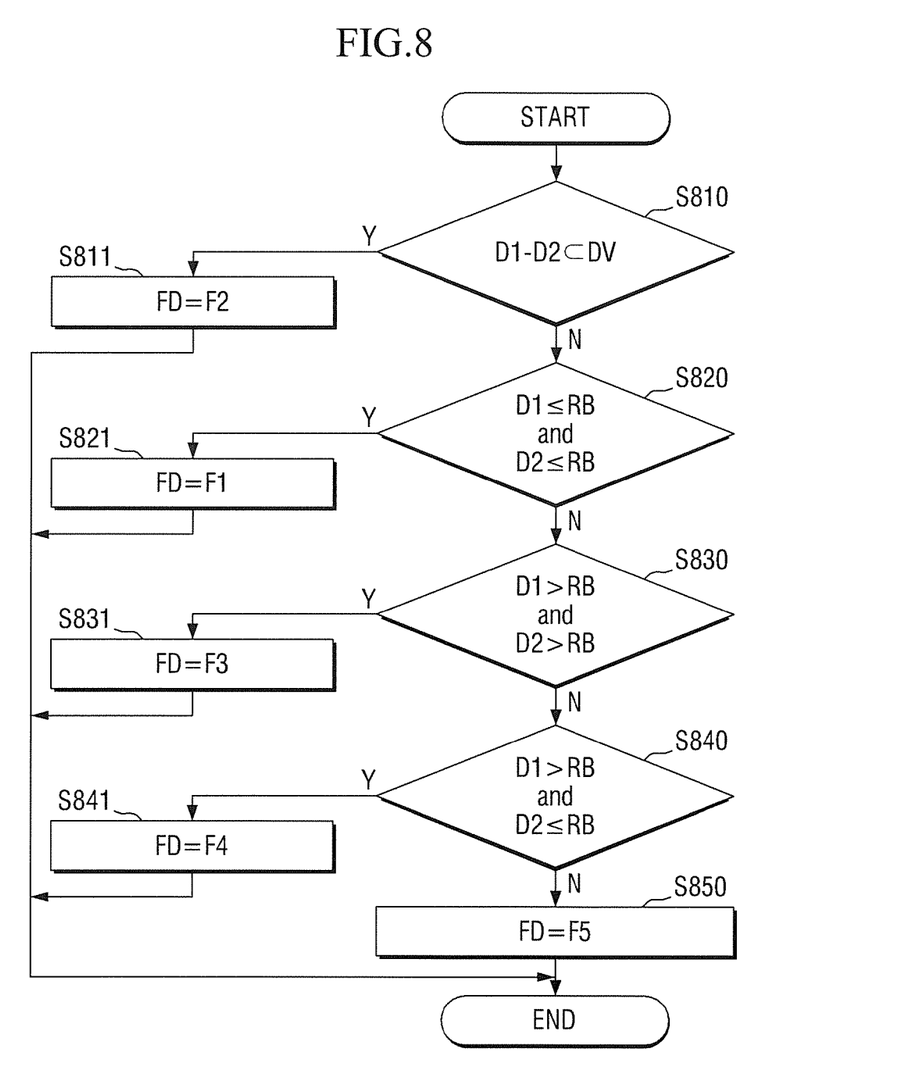
FIG. 8 is a flowchart illustrating a method of determining the format of compressed data using a format determination unit according to another embodiment of the present invention.

Hereinafter, another method of determining the format of compressed data CD using the format determination unit 30 will be described with reference to FIG. 8. FIG. 8 is a flowchart illustrating a method of determining the format of compressed data CD using the format determination unit 30, according to another embodiment of the present invention.

Referring to FIG. 8, the format determination unit 80 determines in step S810 whether a value obtained by subtracting a value of second pixel data D2 from a value of first pixel data D1 is one of values corresponding to difference data DV. When determining that the value obtained by subtracting the value of the second pixel data D2 from the value of the first pixel data D1 is one of the values corresponding to the difference data DV, the format determination unit 30 determines in step S811 that the format of compressed data CD is a second format F2 and generates format data FD corresponding to the second format F2.

When determining that the value obtained by subtracting the value of the second pixel data D2 from the value of the first pixel data D1 is not one of the values corresponding to the difference data DV, the format determination unit 30 determines in step S820 whether each of the number of bits of the value of the first pixel data D1 and the number of bits of the value of the second pixel data D2 is less than or equal to a number of reference bits RB. When determining that each of the number of bits of the value of the first pixel data D1 and the number of bits of the value of the second pixel data D2 is less than or equal to the number of reference bits RB, the format determination unit 30 determines in step S821 that the format of the compressed data CD is the first format F1 and generates the format data FD corresponding to the first format F1.

When determining in step S820 that one of the number of bits of the value of the first pixel data D1 and the number of bits of the value of the second pixel data D2 is not less than or equal to the number of reference bits RB, step S830 is performed. Steps S830 through S850 may be substantially identical to steps S230 through S250 in FIG. 2, respectively. Accordingly, for brevity of description, further description of FIG. 8 will not be provided.

Hereinafter, first through fifth formats F1' through F5' of compressed data CD according to another embodiment of the present invention will be described with reference to FIGS. 9 through 13. The first through fifth formats F1' through F5' can replace the first through fifth formats F1 through F5 in FIGS. 3 through 7, respectively (for example, in the method of FIG. 2).

When the first through fifth formats F1' through F5' replace the first through fifth formats F1 through F5 in FIGS. 3 through 7, respectively, the value of a number of reference difference bits can vary depending on the embodiment. For example, in the embodiment of FIGS. 9 through 13, a number of reference difference bits RDB' may be 3 bits. When the number of reference difference bits RDB' is 3 bits, difference data DV' may have values of '$000_{(2)}$,' '$001_{(2)}$,' '$010_{(2)}$,' '$011_{(2)}$,' '$100_{(2)}$,' '$101_{(2)}$,' '$110_{(2)}$,' or '$111_{(2)}$.' Values that the difference data DV' can have may correspond to successive integers. For example, these values of the difference data DV' may correspond to −4, −3, −2, −1, 0, 1, 2, and 3, respectively. According to some embodiments, at least one of the values that the difference data DV' can have corresponds to 0. According to other embodiments, at least three of the values that the difference data DV' can have correspond to −1, 0, and 1. According to still other embodiments, at least seven of the values that the difference data DV' can have correspond to −3, −2, −1, 0, 1, 2, and 3.

Figure 9:
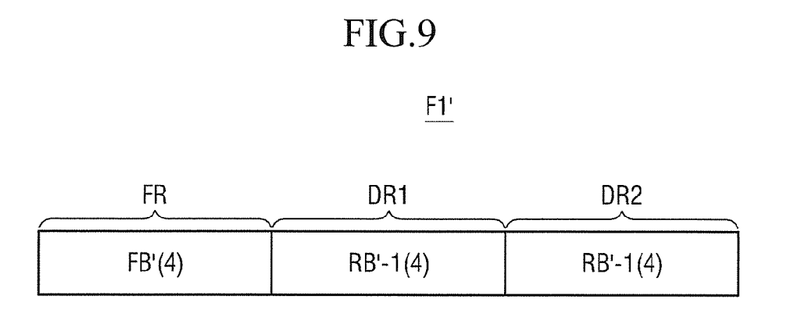
FIG. 9 is a diagram illustrating compressed data in a first format according to another embodiment of the present invention.

FIG. 9 is a diagram illustrating the compressed data CD in the first format F1' according to another embodiment of the present invention.

Referring to FIG. 9, in the first format F1', a flag region FR has a size of a number of reference flag bits FB'. For example, the number of reference flag bits FB' may be 4 bits. For the first format F1', values of 3 high-order bits of the flag region FR may, for example, all be zero. For example, the value of the flag region FR may be '$0000_{(2)}$' or '$0001_{(2)}$.'

In the first format F1', a first data region DR1 is 1 bit smaller than a number of reference bits RB'. For example, when the number of reference bits RB' is 5 bits, a size of the first data region DR1 is 4 bits. In the first format F1', a value of the first data region DR1 is equal to a value obtained by removing the LSB from the number of low-order bits of the first pixel data D1 equal to the number of reference bits RB.'

In the first format F1', a second data region DR2 may be 1 bit smaller than the number of reference bits RB'. For example, when the number of reference bits RB' is 5 bits, a size of the second data region DR2 is 4 bits. In the first format F1', a value of the second data region DR2 is equal to a value obtained by removing the LSB from the number of low-order bits of the second pixel data D2 equal to the number of reference bits RB.'

Figure 10:
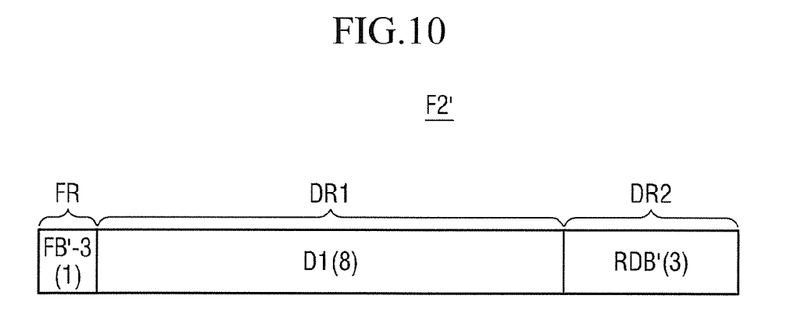
FIG. 10 is a diagram illustrating compressed data in a second format according to another embodiment of the present invention.

FIG. 10 is a diagram illustrating the compressed data CD in the second format F2' according to another embodiment of the present invention.

Referring to FIG. 10, in the second format F2', the size of the flag region FR is 3 bits smaller than the number of reference flag bits FB'. For example, when the number of reference flag bits FB' is 4 bits, the size of the flag region FR in the second format F2' is 1 bit. For example, the value of the flag region FR may be $1_{(2)}$.

In the second format F2', the size of the first data region DR1 is equal to a size of the first pixel data D1. For example, when the size of the first pixel data D1 is 8 bits, the size of the first data region DR1 is 8 bits. The value of the first data region DR1 is equal to the value of the first pixel data D1.

In the second format F2', the size of the second data region DR2 is equal to the number of reference difference bits RDB'. For example, when the number of reference difference bits RDB' is 3 bits, the size of the second data region DR2 is 3 bits. The value of the second data region DR2 is a value of the difference data DV' that corresponds to a value obtained by subtracting the value of the second pixel data D2 from the value of the first pixel data D1.

In the second format F2', the value of the first pixel data D1 is stored without loss in the first data region DR1, and the value corresponding to the value obtained by subtracting the value of the second pixel data D2 from the value of the first pixel data D1 is stored without loss in the second data region DR2. Therefore, the first pixel data D1 and the second pixel data D2 can be compressed without loss. Accordingly, in the second format F2', display quality in areas with a relatively small gray-level change can be improved. In addition, in the second format F2', since the size of the flag region FR is relatively small (i.e., 1 bit), the size of the second data region DR2 that stores the value of the difference data DV' may be large. Therefore, it is possible to expand the range of the value that is obtained by subtracting the value of the second pixel data D2 from the value of the first pixel data D1 and which can be stored without data loss in the second format F2'.

Figure 11:
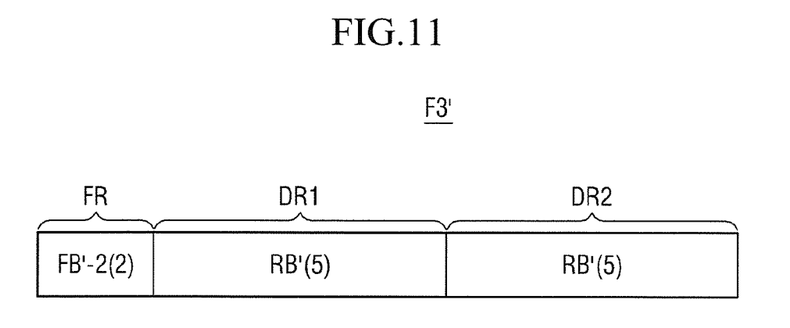
FIG. 11 is a diagram illustrating compressed data in a third format according to another embodiment of the present invention.

FIG. 11 is a diagram illustrating the compressed data CD in the third format F3' according to another embodiment of the present invention.

Referring to FIG. 11, in the third format F3', the size of the flag region FR is 2 bits smaller than the number of reference flag bits FB'. For example, when the number of reference flag bits FB' is 4 bits, the size of the flag region FR is 2 bits. For example, the most significant bit (MSB) of the value of the flag region FR may be 0, and the LSB of the value of the flag region FR may be 1. That is, the value of the flag region FR may be '$01_{(2)}$.'

In the third format F3', the size of the first data region DR1 is equal to the number of reference bits RB'. For example, when the number of reference bits RB' is 5 bits, the size of the first data region DR1 is 5 bits. The value of the first data region DR1 is equal to a value of the high-order bits of the first pixel data D1, the number of high-order bits being equal to the size of the first data region DR1.

In the third format F3', the size of the second data region DR2 is equal to the number of reference bits RB'. For example, when the number of reference bits RB' is 5 bits, the size of the second data region DR2 is 5 bits. The value of the second data region DR2 is equal to a value of the high-order bits of the second pixel data D2, the number of high-order bits being equal to the size of the second data region DR2.

Figure 12:
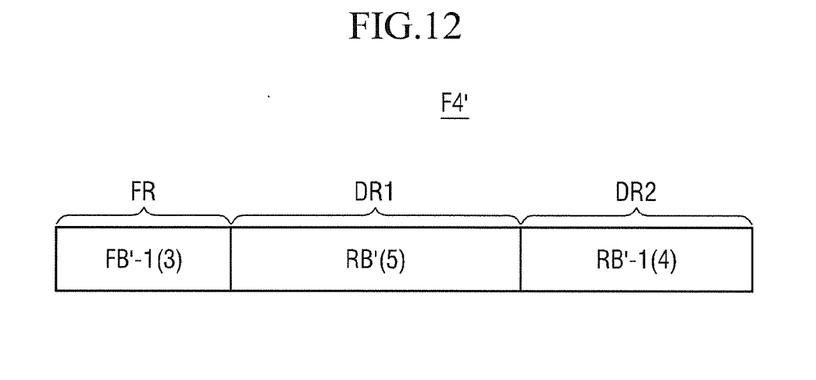
FIG. 12 is a diagram illustrating compressed data in a fourth format according to another embodiment of the present invention.

FIG. 12 is a diagram illustrating the compressed data CD in the fourth format F4' according to another embodiment of the present invention.

Referring to FIG. 12, in the fourth format F4', the size of the flag region FR is 1 bit smaller than the number of reference flag bits FB'. For example, when the number of reference flag bits FB' is 4 bits, the size of the flag region FR is 3 bits. For example, the value of the flag region FR may be a value whose 2 high-order bits are 0 and LSB is 1. That is, the value of the flag region FR may be '$001_{(2)}$.'

In the fourth format F4', the size of the first data region DR1 is equal to the number of reference bits RB'. For example, when the number of reference bits RB' is 5 bits, the size of the first data region DR1 is 5 bits. The value of the first data region DR1 is equal to the value of the high-order bits of the first pixel data D1, the number of high-order bits being equal to the size of the first data region DR1.

In the fourth format F4', the size of the second data region DR2 is 1 bit smaller than the number of reference bits RB'. For example, when the number of reference bits RB' is 5 bits, the size of the second data region DR2 is 4 bits. The value of the second data region DR2 is equal to a value obtained by removing the LSB from the number of low-order bits of the second pixel data D2 equal to the number of reference bits RB'. For example, when the second pixel data D2 is '$00001101(2)$' and the number of reference bits RB' is 5 bits, the value of the second data region DR2 is '$0110_{(2)}$.'

In the fourth format F4', if each of the first pixel data D1 and the second pixel data D2 has a size of 8 bits, and if the number of reference bits RB' is 5 bits, then when the first pixel data D1 is stored in the first data region DR1, 3 low-order bits of data are lost. On the other hand, when the second pixel data D2, which is relatively low gray-level data, is stored in the second data region DR2, only 1 low-order bit of data is lost. Therefore, the pixel data compression device 100 can reduce the loss of low gray-level pixel data in the fourth format F4', thereby reducing or preventing the deterioration of display quality at low gray levels.

Figure 13:
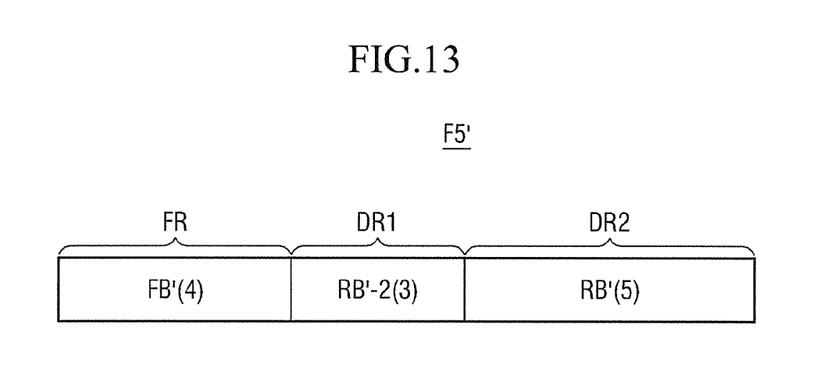
FIG. 13 is a diagram illustrating compressed data in a fifth format according to another embodiment of the present invention.

FIG. 13 is a diagram illustrating the compressed data CD in the fifth format F5' according to another embodiment of the present invention.

Referring to FIG. 13, in the fifth format F5', the size of the flag region FR is equal to the number of reference flag bits FB'. For example, when the number of reference flag bits FB' is 4 bits, the size of the flag region FR is 4 bits. For example, values of 3 high-order bits of the flag region FR may all be 0. That is, when the value of the flag region FR in the first format F1' is '$0000_{(2)}$,' the value of the flag region FR in the fifth format F5' is '$0001_{(2)}$,' and vice versa.

In the fifth format F5', the size of the first data region DR1 is 2 bits smaller than the number of reference bits RB'. For example, when the number of reference bits RB' is 5 bits, the size of the first data region DR1 is 3 bits. The value of the first data region DR1 is equal to a value obtained by removing 2 LSBs from the number of low-order bits of the first pixel data D1 equal to the number of reference bits RB'.

In the fifth format F5', the size of the second data region DR2 is equal to the number of reference bits RB'. For example, when the number of reference bits RB' is 5 bits, the size of the second data region DR2 is 5 bits. The value of the second data region DR2 is equal to the value of the high-order bits of the second pixel data D2, the number of high-order bits being equal to the size of the second data region DR2.

In the fifth format F5', if each of the first pixel data D1 and the second pixel data D2 has a size of 8 bits, and if the number of reference bits RB' is 5 bits, then when the second pixel data D2 is stored in the second data region DR2, 3 low-order bits of data are lost. On the other hand, when the first pixel data D1, which is relatively low gray-level data, is stored in the first data region DR1, only 2 low-order bits of data are lost. For example, when the first pixel data D1 is '$00001101(2)$' and the number of reference bits RB' is 5 bits, the value of the first data region DR1 is '$011_{(2)}$.' Therefore, the pixel data compression device 100 can reduce the loss of low gray-level pixel data in the fifth format F5', thereby reducing or preventing the deterioration of display quality at low gray levels.

Embodiments of the present invention provide various features, such as a pixel data compression device that can improve the display quality of an image, or a pixel data compression device that can reduce the loss of pixel data at low gray levels.

However, the embodiments of the present invention are not restricted to those set forth herein. The above and other features of the present invention will become more apparent to one of ordinary skill in the art to which the present invention pertains by referencing the written description along with the following claims and their equivalents.

What is claimed is:

1. A pixel data compression device comprising:
 a first judgment unit for comparing a number of bits of a value of first pixel data and a number of bits of a value of second pixel data with a number of reference bits;
 a format determination unit for determining a format of compressed data, the format corresponding to the number of bits of the value of the first pixel data and the number of bits of the value of the second pixel data; and
 a compression unit for generating the compressed data, which corresponds to the format of the compressed data, from the first pixel data and the second pixel data, wherein the compressed data comprises a flag region, a first data region, and a second data region,
 wherein the format determination unit is configured to determine that the format of the compressed data is a first format when each of the number of bits of the value of the first pixel data and the number of bits of the value of the second pixel data is less than or equal to the number of reference bits, and
 wherein in the first format, a size of the first data region and a size of the second data region are equal to the number of reference bits, a value of the first data region is equal to the value of the first pixel data, and a value of the second data region is equal to the value of the second pixel data.

2. The compression device of claim 1, wherein each of the first pixel data and the second pixel data has a size of 8 bits, the number of reference bits is 5 bits, the compressed data has a size of 12 bits, and the flag region in the first format has a size of 2 bits.

3. The compression device of claim 1, wherein the number of reference bits is smaller than a number of bits of the first pixel data and a number of bits of the second pixel data.

4. The compression device of claim 1, further comprising a second judgment unit for determining whether a value obtained by subtracting the second pixel data from the first pixel data corresponds to one of values of difference data that has a size that corresponds to a number of reference difference bits, wherein the values of the difference data correspond to successive integers and one of the values of the difference data corresponds to zero.

5. The compression device of claim 4, wherein two of the values of the difference data correspond to 1 and −1.

6. The compression device of claim 4, wherein the number of reference difference bits is 2 bits.

7. The compression device of claim 4,
wherein when at least one of the number of bits of the value of the first pixel data or the number of bits of the value of the second pixel data exceeds the number of reference bits and when the value obtained by subtracting the second pixel data from the first pixel data corresponds to one of the values of the difference data, the format determination unit is configured to determine that the format of the compressed data is a second format, and
wherein in the second format, the size of the flag region is equal to the size of the flag region in the first format, the size of the first data region is equal to a number of bits of the first pixel data, the value of the first data region is equal to the value of the first pixel data, the size of the second data region is equal to the number of reference difference bits, and the value of the second data region corresponds to the value obtained by subtracting the second pixel data from the first pixel data.

8. The compression device of claim 4,
wherein when each of the number of bits of the value of the first pixel data and the number of bits of the value of the second pixel data exceeds the number of reference bits and when the value obtained by subtracting the second pixel data from the first pixel data does not correspond to one of the values of the difference data, the format determination unit is configured to determine that the format of the compressed data is a third format, and
wherein in the third format, the size of the flag region is equal to the size of the flag region in the first format, the size of the first data region and the size of the second data region are equal to the number of reference bits, the value of the first data region is equal to a value of first high-order bits of the first pixel data, a number of the first high-order bits is equal to the size of the first data region, the value of the second data region is equal to a value of second high-order bits of the second pixel data, and a number of the second high-order bits is equal to the size of the second data region.

9. The compression device of claim 4, wherein when each of the number of bits of the value of the first pixel data and the number of bits of the value of the second pixel data is less than the number of reference bits and when the value obtained by subtracting the second pixel data from the first pixel data corresponds to one of the values of the difference data, the format determination unit is configured to determine that the format of the compressed data is the first format.

10. The compression device of claim 4,
wherein when the number of bits of the value of the first pixel data exceeds the number of reference bits, when the number of bits of the value of the second pixel data is less than or equal to the number of reference bits, and when the value obtained by subtracting the second pixel data from the first pixel data does not correspond to one of the values of the difference data, the format determination unit is configured to determine that the format of the compressed data is a fourth format, and
wherein in the fourth format, the size of the flag region is 1 bit greater than the size of the flag region in the first format, the size of the first data region is equal to the number of reference bits, the value of the first data region is equal to the value of high-order bits of the first pixel data, a number of the high-order bits is equal to the size of the first data region, the size of the second data region is 1 bit smaller than the number of reference bits, and the value of the second data region is equal to a value obtained by removing a least significant bit (LSB) from a number of low-order bits of the second pixel data equal to the number of reference bits.

11. The compression device of claim 4,
wherein when the number of bits of the value of the first pixel data is less than or equal to the number of reference bits, when the number of bits of the value of the second pixel data is greater than the number of reference bits, and when the value obtained by subtracting the second pixel data from the first pixel data does not correspond to one of the values of the difference data, the format determination unit is configured to determine that the format of the compressed data is a fifth format, and
wherein in the fifth format, the size of the flag region is 1 bit greater than the size of the flag region in the first format, the size of the first data region is 1 bit smaller than the number of reference bits, the value of the first data region is equal to a value obtained by removing a least significant bit (LSB) from a number of low-order bits of the first pixel data equal to the number of reference bits, the size of the second data region is equal to the number of reference bits, the value of the second data region is equal to the value of high-order bits of the second pixel data, and a number of the high-order bits is equal to the size of the second data region.

12. A pixel data compression device comprising:
a first judgment unit for comparing a number of bits of a value of first pixel data and a number of bits of a value of second pixel data with a number of reference bits;
a format determination unit for determining a format of compressed data that corresponds to the number of bits of the value of the first pixel data and the number of bits of the value of the second pixel data; and
a compression unit for generating the compressed data, which corresponds to the format of the compressed data, from the first pixel data and the second pixel data,
wherein the compressed data comprises a flag region, a first data region, and a second data region,
wherein the format determination unit is configured to determine that the format of the compressed data is a first format when each of the number of bits of the value of the first pixel data and the number of bits of the value of the second pixel data is less than or equal to the number of reference bits,
wherein in the first format, a size of the flag region is a number of reference flag bits, a size of the first data region and a size of the second data region are 1 bit smaller than the number of reference bits, a value of the first data region is equal to a value obtained by removing a least significant bit (LSB) from a number of low-order bits of the first pixel data equal to the number of reference bits, and a value of the second data region is equal to a value obtained by removing the LSB from a number of low-order bits of the second pixel data equal to the number of reference bits.

13. The compression device of claim 12, wherein each of the first pixel data and the second pixel data has a size of 8 bits, the number of reference bits is 4 bits, the compressed data has a size of 12 bits, and the number of reference flag bits is 4 bits.

14. The compression device of claim 12, further comprising a second judgment unit for determining whether a value obtained by subtracting the second pixel data from the first pixel data corresponds to one of values of difference data that has a size corresponding to a number of reference difference bits, wherein the values of the difference data correspond to successive integers and one of the values of the difference data corresponds to zero.

15. The compression device of claim 14, wherein the number of reference difference bits is 3 bits.

16. The compression device of claim 14,
wherein when the value obtained by subtracting the second pixel data from the first pixel data corresponds to one of the values of the difference data, the format determination unit is configured to determine that the format of the compressed data is a second format, and
wherein in the second format, the size of the flag region is 3 bits smaller than the number of reference flag bits, the size of the first data region is equal to a number of bits of the first pixel data, the value of the first data region is equal to the value of the first pixel data, the size of the second data region is equal to the number of reference difference bits, and the value of the second data region corresponds to the value obtained by subtracting the second pixel data from the first pixel data.

17. The compression device of claim 14,
wherein when each of the number of bits of the value of the first pixel data and the number of bits of the value of the second pixel data exceeds the number of reference bits and when the value obtained by subtracting the second pixel data from the first pixel data does not correspond to one of the values of the difference data, the format determination unit is configured to determine that the format of the compressed data is a third format, and
wherein in the third format, the size of the flag region is 2 bits smaller than the number of reference flag bits, the size of the first data region and the size of the second data region are equal to the number of reference bits, the value of the first data region is equal to a value of first high-order bits of the first pixel data, a number of the first high-order bits is equal to the number of reference bits, the value of the second data region is equal to a value of second high-order bits of the second pixel data, and a number of the second high-order bits is equal to the number of reference bits.

18. The compression device of claim 14, wherein when each of the number of bits of the value of the first pixel data and the number of bits of the value of the second pixel data is less than or equal to the number of reference bits and when the value obtained by subtracting the second pixel data from the first pixel data corresponds to one of the values of the difference data, the format determination unit is configured to determine that the format of the compressed data is not the first format.

19. The compression device of claim 14,
wherein when the number of bits of the value of the first pixel data exceeds the number of reference bits, when the number of bits of the value of the second pixel data is less than or equal to the number of reference bits, and when the value obtained by subtracting the second pixel data from the first pixel data does not correspond to one of the values of the difference data, the format determination unit is configured to determine that the format of the compressed data is a fourth format, and
wherein in the fourth format, the size of the flag region is 1 bit smaller than the number of reference flag bits, the size of the first data region is equal to the number of reference bits, the value of the first data region is equal to a value of high-order bits of the first pixel data, a number of the high-order bits is equal to the size of the first data region, the size of the second data region is 1 bit smaller than the number of reference bits, and the value of the second data region is equal to the value obtained by removing the LSB from the number of low-order bits of the second pixel data equal to the number of reference bits.

20. The compression device of claim 14,
wherein when the number of bits of the value of the first pixel data is less than or equal to the number of reference bits, when the number of bits of the value of the second pixel data exceeds the number of reference bits, and when the value obtained by subtracting the second pixel data from the first pixel data does not correspond to one of the values of the difference data, the format determination unit is configured to determine that the format of the compressed data is a fifth format, and
wherein in the fifth format, the size of the flag region is equal to the number of reference flag bits, the size of the first data region is 2 bits smaller than the number of reference bits, the value of the first data region is equal to a value obtained by removing 2 LSBs from the number of low-order bits of the first pixel data equal to the number of reference bits, the size of the second data region is equal to the number of reference bits, the value of the second data region is equal to a value of high-order bits of the second pixel data, and a number of the high-order bits is equal to the size of the second data region.

* * * * *